(12) United States Patent
Fukui et al.

(10) Patent No.: US 9,751,281 B2
(45) Date of Patent: Sep. 5, 2017

(54) INORGANIC FIBER MOLDED BODY AND PROCESS FOR PRODUCING THE SAME

(71) Applicant: Mitsubishi Chemical Corporation, Tokyo (JP)

(72) Inventors: Tsuyoshi Fukui, Joetsu (JP); Toshio Ito, Joetsu (JP); Yusaku Hata, Joetsu (JP); Hisashi Aoyagi, Joetsu (JP); Hidetaka Ito, Joetsu (JP)

(73) Assignee: Mitsubishi Chemical Corporation, Tokyo (JP)

( * ) Notice: Subject to any disclaimer, the term of this patent is extended or adjusted under 35 U.S.C. 154(b) by 547 days.

(21) Appl. No.: 14/198,998

(22) Filed: Mar. 6, 2014

(65) Prior Publication Data

US 2014/0186599 A1    Jul. 3, 2014

Related U.S. Application Data

(63) Continuation-in-part of application No. PCT/JP2012/072226, filed on Aug. 31, 2012.

(30) Foreign Application Priority Data

Sep. 7, 2011  (JP) ................................ 2011-195508

(51) Int. Cl.
| | | |
|---|---|---|
| B32B 7/02 | (2006.01) | |
| B28B 23/00 | (2006.01) | |
| D04H 1/4209 | (2012.01) | |
| C04B 35/111 | (2006.01) | |
| C04B 35/80 | (2006.01) | |
| F27D 1/00 | (2006.01) | |
| F01N 3/28 | (2006.01) | |
| F24B 13/00 | (2006.01) | |

(52) U.S. Cl.
CPC ............ *B32B 7/02* (2013.01); *B28B 23/0081* (2013.01); *C04B 35/111* (2013.01); *C04B 35/803* (2013.01); *D04H 1/4209* (2013.01); *F27D 1/0006* (2013.01); *F27D 1/0009* (2013.01); *C04B 2235/526* (2013.01); *C04B 2235/5228* (2013.01); *C04B 2235/5264* (2013.01); *C04B 2235/606* (2013.01); *C04B 2235/608* (2013.01); *C04B 2235/616* (2013.01); *C04B 2235/77* (2013.01); *C04B 2235/786* (2013.01); *C04B 2235/96* (2013.01); *F01N 3/2864* (2013.01); *F24B 13/002* (2013.01); *F27D 2001/0073* (2013.01); *Y10T 428/24992* (2015.01)

(58) Field of Classification Search
CPC .... B32B 7/02; B28B 23/0081; D04H 1/4209; F27D 1/0006; F27D 1/0009; F27D 2001/0073; F24B 13/002; F01N 3/2864; C04B 35/624
See application file for complete search history.

(56) References Cited

U.S. PATENT DOCUMENTS

| | | | | |
|---|---|---|---|---|
| 3,808,015 A | * | 4/1974 | Seufert | ............. C04B 35/62236 501/127 |
| 6,444,600 B1 | * | 9/2002 | Baek | ....................... C04B 30/02 501/95.1 |
| 2001/0019767 A1 | * | 9/2001 | Naber | ..................... C03B 37/01 428/375 |
| 2006/0292332 A1 | | 12/2006 | Ohno et al. | |
| 2009/0041638 A1 | | 2/2009 | Tomosue et al. | |
| 2009/0078514 A1 | | 3/2009 | Baud et al. | |
| 2012/0219464 A1 | | 8/2012 | Sasaki et al. | |

FOREIGN PATENT DOCUMENTS

| | | |
|---|---|---|
| CN | 1222219 A | 7/1999 |
| EP | 0 906 495 B1 | 6/2001 |
| EP | 1 752 631 A1 | 2/2007 |
| EP | 2 226 425 A1 | 9/2010 |
| JP | 10-139561 A | 5/1998 |
| JP | 2003-80031 A | 3/2003 |
| JP | 2008-525295 A | 7/2008 |
| JP | 2011-208344 A | 10/2011 |
| WO | WO 2011/055736 A1 | 5/2011 |

OTHER PUBLICATIONS

Extended European Search Report issued May 29, 2015 in Patent Application No. 12830310.4.
U.S. Appl. No. 14/342,627, filed Mar. 4, 2014, Hata, et al.
International Preliminary Report on Patentability and Written Opinion issued Mar. 20, 2014 in PCT/JP2012/072226 filed Aug. 31, 2012.
Combined Office Action and Search Report issued Jul. 3, 2015 in Chinese Patent Application No. 201280043279.0 (submitting English translation only).

\* cited by examiner

*Primary Examiner* — Aaron Austin
*Assistant Examiner* — Jasper Saberi
(74) *Attorney, Agent, or Firm* — Oblon, McClelland, Maier & Neustadt, L.L.P.

(57) ABSTRACT

The inorganic fiber molded body of the present invention is characterized in that the molded body has an extremely light weight, and is free from problems such as scattering of fibers and particulate matters from a surface thereof and environmental pollution such as generation of harmful gases. In addition, the present invention provides an inorganic fiber molded body that is excellent in not only thermal shock resistance and mechanical shock resistance but also a high-speed wind erosion resistance, well-balanced in properties and can be used in the applications of various heat-insulating materials. The present invention relates to an inorganic fiber molded body comprising inorganic fibers and inorganic binder particles and having at least one set of a high-fiber density region and a low-fiber density region, in which a ratio of a content of the binder particles in the high-fiber density region to a content of the binder particles in the low-fiber density region as measured by a predetermined method is 0.5:1 to 5:1; and a number-average particle diameter and the number of the inorganic binder particles on an outermost surface of the molded body as measured by a predetermined method are 20 to 35 μm and less than 15, respectively.

17 Claims, No Drawings

INORGANIC FIBER MOLDED BODY AND PROCESS FOR PRODUCING THE SAME

TECHNICAL FIELD

The present invention relates to an inorganic fiber molded body and a process for producing the inorganic fiber molded body, and more particularly, to an inorganic fiber molded body having an extremely light weight which is excellent in thermal shock resistance and mechanical shock resistance, free from problems upon handling, such as scattering of fibers and particulate matters and generation of gases, and useful as a veneering material for an inner wall of various industrial furnaces and a lid of a ladle for molten metal, etc., a heat-insulating material for transporting systems or a heat-insulating material for burner tiles, etc., and a process for producing the inorganic fiber molded body.

BACKGROUND ART

There are conventionally known inorganic fiber molded bodies produced by subjecting a slurry comprising inorganic fibers such as alumina fibers and silica fibers, inorganic particles, an inorganic binder, an organic binder and the like to dehydration molding process and then firing the resulting dehydration-molded product. The inorganic fiber molded bodies have been used as a refractory insulating material for high-temperature industrial furnaces because they have a relatively light weight, an easy-processing ability, a shape-retaining capability, and an excellent heat insulating property. On the other hand, in recent years, in order to improve an ability of controlling an inside temperature of high-temperature firing furnaces and achieving saving of energy, an aggregate of inorganic fibers subjected to needling treatment has been frequently used as a high-temperature insulting material (blanket block) by utilizing excellent properties thereof such as an extremely light weight, an easy-processing ability and a high thermal shock resistance.

However, since the inorganic fibers are usually in the form of an aggregate of fibers having various lengths, the conventional inorganic fiber molded bodies obtained merely by subjecting a slurry comprising such inorganic fibers together with a binder component, etc., to dehydration molding process and then firing the resulting dehydration-molded product tend to have such a problem that they suffer from occurrence of cracks on a surface thereof owing to mechanical shock or thermal shock upon cutting or upon use, so that the inorganic fibers and particulate matters present on the surface of the molded bodies fall off therefrom and scattered.

In particular, the above problem tends to become more remarkable in the case where the inorganic fibers include fibers having a fiber diameter of not more than 3 μm which are produced by a melt-spinning method and defined as an inhalative fiber by WHO (World Health Organization). Also, it is known that fibers obtained from a silica-based raw material are converted into cristobalite that is harmful to human body when exposed to a high temperature of not lower than 1000° C. These problems including scattering of the fibers and particulate matters and production of the harmful substances are undesirable from the standpoint of maintaining good working environments. If the molded bodies suffer from occurrence of cracks upon exposure to thermal shock or mechanical shock, the molded bodies tend to lose their function as a heat-insulating material owing to falling-off of a part of the inorganic fibers therefrom.

On the other hand, when the aggregate of inorganic fibers subjected to needling treatment are directly formed into blocks and used as a heat-insulating material for high-temperature furnaces, although the resulting material is excellent in thermal shock resistance, there tends to arise such a problem that the heat-insulating material suffers from wind erosion on a surface thereof owing to adverse influence of a wind blow speed of a burner if a high-wind blow speed burner such as a high-speed gas burner is used under some conditions, so that the fibers contained in the aggregate of inorganic fibers tend to be scattered.

To prevent scattering of the fibers, there has been proposed, for example, the technique of coating a surface of an inorganic fiber molded body with a glass layer (for example, refer to Patent Documents 1 and 2). However, in this method, there tends to arise such a problem that the glass layer is peeled off from a substrate of the inorganic fiber molded body or suffers from occurrence of cracks owing to thermal expansion when used under high-temperature conditions.

There has been proposed an alternative method in which a coating material comprising inorganic fibers, inorganic particles, an inorganic binder and an organic binder is applied on an inorganic fiber molded body (for example, refer to Patent Document 3). However, in this method, there also tends to arise such a problem that adhesion between the coating layer and the inorganic fiber molded body becomes insufficient depending upon use conditions, so that the coating layer is peeled off from the inorganic fiber molded body upon exposure to thermal shock or mechanical shock.

Further, in any of the above conventional techniques, the inorganic fiber molded body itself is produced by subjecting a slurry of fibrillated fibers to dehydration molding process. Therefore, the obtained molded products tend to be structurally poor against a load such as bending, and tend to suffer from problems such as occurrence of cracks owing to vibration caused upon processing, transportation or use as well as poor thermal shock resistance.

In addition, as the method of improving a wind erosion resistance of an inorganic fiber molded body, there have been proposed methods other than the coating methods. For example, there has been proposed the method of spraying an organic or inorganic binder onto a mat-like aggregate of inorganic fibers and subjecting the resulting product to drying and molding (for example, refer to Patent Document 4). However, this method tends to have such a problem that it is basically difficult to prepare a thick insulating material.

The above method further has such a problem that while drying the aggregate of inorganic fibers comprising the binder, the impregnated binder tends to be migrated near to the surface of the aggregate of inorganic fibers. That is, there tends to arise the problem that even when the thin mat-like aggregates of inorganic fibers obtained after drying are overlapped and laminated on each other to prepare a thick insulating material according to the above method, adhesion between the overlapped surfaces of the mat-like aggregates becomes insufficient, so that delamination of the laminated mat-like aggregates is likely to occur. In addition, since the particulate matters are more likely to be deposited on a surface of the resulting molded body rather than between the laminated mat-like aggregates, there also tends to arise such a problem that the deposited particulate matters readily fall off from the surface of the molded body upon application of mechanical shock thereto.

Apart from the above techniques, there has been proposed the method of laminating a plurality of blankets or mats formed of inorganic fibers, impregnating the resulting laminate with an inorganic binder and freezing the obtained product to produce an inorganic fiber molded body that is excellent in heat resistance and strength even inside thereof (for example, refer to Patent Document 5). However, the inorganic fiber molded body obtained by this method tends to suffer from delamination between the inorganic fiber layers and therefore tends to be remarkably deteriorated in durability against thermal shock.

To solve the above problems, there has also been proposed the method in which an inorganic fiber blanket layer is disposed an inner wall side of a furnace whereas a kneaded material layer formed of inorganic fibers, a binder and refractory particles is disposed on an outer wall side of the furnace to reduce thermal shock against the kneaded material layer and prevent propagation of cracks toward the inner layer of the furnace (for example, refer to Patent Document 6).

However, since the inorganic fiber molded article is produced from a slurry comprising an organic binder, there tends to arise such a problem that if the slurry is used in a large amount, a preliminary firing step of the molded article is required, resulting in increased costs, whereas if no preliminary firing step thereof is conducted, the obtained molded article suffers from occurrence of cracks even at a relatively low temperature.

CITATION LIST

Patent Literature

Patent Document 1: Japanese Patent Publication (KOKOKU) No. 57-13514
Patent Document 2: Japanese Patent Application Laid-Open (KOKAI) No. 1-219083
Patent Document 3: Japanese Patent Application Laid-Open (KOKAI) No. 2001-278680
Patent Document 4: Japanese Patent Application Laid-Open (KOKAI) No. 2002-4848
Patent Document 5: Japanese Patent Application Laid-Open (KOKAI) No. 2008-1574
Patent Document 6: Japanese Patent Application Laid-Open (KOKAI) No. 11-255554

SUMMARY OF THE INVENTION

Problems to be Solved by the Invention

The present invention provides an inorganic fiber molded body having an extremely light weight which is free from problems such as scattering of fibers and particulate matters from a surface thereof and environmental pollution such as generation of harmful gases, is excellent in not only thermal shock resistance and mechanical shock resistance but also high-speed wind erosion resistance, comprises a less amount of particulate matters on an outermost surface of the molded body, and is suitable as a heat-insulating material.

As a result of the present inventors' earnest study for solving the above problems, an inorganic fiber molded body obtained by impregnating an inorganic sol into an inorganic fiber molded product formed of an aggregate of inorganic fibers, preferably, an aggregate of inorganic fibers comprising no thin fibers and being subjected to needling treatment, and drying the impregnated product, has been noticed. The present inventors have further conducted earnest study on various conditions such as a drying method and a drying time in a process for producing the inorganic fiber molded body, in particular, a drying step thereof, as well as properties of the obtained inorganic fiber molded body.

As a result, it has been found that in the case where there is established a predetermined relationship between a density gradient of inorganic fibers in a thickness direction of the inorganic fiber molded body, specifically for example, in a vertical direction of a mat-like inorganic fiber molded body assuming that a plane of the molded body having a largest area is a bottom surface thereof, and conditions of a sol impregnated in the inorganic fiber molded body, more specifically, a particle diameter and a concentration (number) of the sol, it is possible to obtain such an inorganic fiber molded body formed of a material having an extremely light weight which is free from problems such as scattering of fibers and particulate matters from a surface thereof and generation of harmful gases, and the resulting inorganic fiber molded body is excellent in not only thermal shock resistance and mechanical shock resistance but also high-speed wind erosion resistance, comprises a less amount of particulate matters on an outermost surface of the molded body, and is suitable as a heat-insulating material. The present invention has been completed in such a manner.

The present invention has been attained on the basis of the above finding, and includes the following aspects.

That is, in a first aspect of the present invention, there is provided an inorganic fiber molded body comprising inorganic fibers and inorganic binder particles and having at least one set of a high-fiber density region and a low-fiber density region, in which a ratio of a content of the binder particles in the high-fiber density region to a content of the binder particles in the low-fiber density region as measured by the method defined below is 0.5:1 to 5:1; and a number-average particle diameter and the number of the inorganic binder particles on an outermost surface of the molded body as measured by the method defined below are 20 to 35 μm and less than 15, respectively:

method of measuring the content of the binder particles in the high-fiber density region and the content of the binder particles in the low-fiber density region in which the inorganic fiber molded body is equally divided into five parts in a thickness direction thereof to prepare first to fifth layer specimens, and the respective specimens are fired at 1000° C. for 3 hr to measure weights of the specimens before and after the firing (weight loss owing to the firing) and calculate contents of the inorganic binder particles in the respective specimens; and method of measuring the number-average particle diameter and the number of the inorganic binder particles, in which they are respectively determined by measuring a minor axis diameter and the number of the inorganic particles present in an area of 400 μm×400 μm as viewed on a scanning electron micrograph of the molded body.

In the preferred embodiment of the first aspect of the present invention, there is provided the inorganic fiber molded body wherein a difference between an absolute value of a surface density of the high-fiber density region and an absolute value of a surface density of the low-fiber density region is not less than 0.005 g/cm$^2$; the high-fiber density regions are provided at both ends of the inorganic fiber molded body in a thickness direction thereof, and the low-fiber density region is provided between the high-fiber density regions; and the inorganic fibers have a crystallinity of not less than 50%.

In addition, in a second aspect of the present invention, there is provided a process for producing the aforementioned inorganic fiber molded body, comprising the steps of:

impregnating an inorganic binder into an aggregate of inorganic fibers; and drying the aggregate of inorganic fibers impregnated with the inorganic binder by suction dehydration from a bottom surface thereof.

In the preferred embodiment of the second aspect of the present invention, there is provided the process wherein the aggregate of inorganic fibers impregnated with the inorganic binder is subjected to suction dehydration from the bottom surface, and at the same time, an upper surface of the inorganic fiber molded body is brought into contact with a dry gas flow having a temperature of 60 to 200° C.; and the inorganic binder impregnated is an inorganic binder composition comprising acetic acid and having a viscosity of 5 to 150 cp. Further, the above process comprises the steps of:

subjecting an aggregate of an inorganic fiber precursor to needling treatment;

firing the aggregate of the inorganic fiber precursor subjected to needling treatment; and impregnating the inorganic binder into the aggregate of inorganic fibers obtained by the firing step, followed by drying the resulting product, the aggregate of the inorganic fiber precursor subjected to needling treatment being fired at a temperature of 1100 to 1400° C. for 0.5 to 4 hr.

Effect of the Invention

The inorganic fiber molded body according to the present invention has an extremely light weight, and is free from problems such as scattering of fibers and particulate matters from a surface thereof and environmental pollution such as generation of harmful gases. In addition, the inorganic fiber molded body is excellent in not only thermal shock resistance and mechanical shock resistance but also high-speed wind erosion resistance, well-balanced in properties and can be therefore suitably used in the applications of various kinds of heat-insulating materials.

The inorganic fiber molded body of the present invention can be formed into various optional shapes or can be subjected to various processes such as slitting, cutting and bonding, and can be suitably used as a heat-insulating material. The heat-insulating material may be used, for example, in the applications such as flat boards and cylindrical sleeve-shaped insulating materials, and also generally suitably used in the applications including walls of furnaces such as electric furnaces and iron-making furnaces which are used under high-temperature conditions, and various pipes around these furnaces, and refractory insulating materials for support members such as skid posts.

PREFERRED EMBODIMENTS FOR CARRYING OUT THE INVENTION

The preferred embodiments of the present invention will be described in more detail below.
[Inorganic Fiber Molded Body]

The inorganic fiber molded body according to the present invention comprises inorganic fibers and inorganic binder particles and having at least one set of a high-fiber density region and a low-fiber density region, in which a ratio of a content of the binder particles in the high-fiber density region to a content of the binder particles in the low-fiber density region as measured by the method defined below is 0.5:1 to 5:1; and a number-average particle diameter and the number of the inorganic binder particles on an outermost surface of the molded body as measured by the method defined below are 20 to 35 μm and less than 15, respectively:

Method of measuring the content of the binder particles in the high-fiber density region and the content of the binder particles in the low-fiber density region, in which the inorganic fiber molded body is equally divided into five parts in a thickness direction thereof to prepare first to fifth layer specimens, and the respective specimens are fired at 1000° C. for 3 hr to measure weights of the specimens before and after the firing (weight loss owing to the firing) and calculate contents of the inorganic binder particles in the respective specimens; and Method of measuring the number-average particle diameter and the number of the inorganic binder particles, in which they are respectively determined by measuring a minor axis diameter and the number of the inorganic particles present in an area of 400 μm×400 μm as viewed on a scanning electron micrograph of the molded body.

The shape of the inorganic fiber molded body is optional. For example, in the case where the inorganic fiber molded body has a mat shape, i.e., a flat rectangular parallelopiped shape having an approximately constant height, the thickness direction of the mat-like inorganic fiber molded body is consistent with a height direction of the molded body, i.e., a vertical direction thereof when the mat-like inorganic fiber molded body is rested on a horizontal plane such that a surface thereof having a maximum surface area is a bottom surface.

The bottom surface of the inorganic fiber molded body, for example, the mat-like inorganic fiber molded body, may be of either a flat shape or an undulated shape such as a dimpled shape. The inorganic fiber molded body may have an optional shape, and may include not only the above mat-like inorganic fiber molded body, but also an L-shaped molded body obtained by bonding the two mat-like molded bodies to each other, and an endless-shaped molded body obtained by bonding both ends of the mat-like molded body to each other, i.e., such as a tubular molded body having a cylindrical shape or a polygonal prism shape. The thickness direction of these molded bodies having various different shapes other than the mat-like inorganic fiber molded body is defined as the thickness direction of each mat-like inorganic fiber molded body constituting these molded bodies.

Meanwhile, in the case where the inorganic fiber molded body has a non-mat-like shape such as a cubic shape, for example, in the case where the inorganic fiber molded body is a needle blanket, the thickness direction of the inorganic fiber molded body means the direction perpendicular to a needle entering surface thereof. In the case where the inorganic fiber molded body is a non-needling product such as an aggregate of fibrillated short fibers, the thickness direction of the inorganic fiber molded body means the direction perpendicular to its surface on which the short fibers are deposited.

One of features of the inorganic fiber molded body resides in that the molded body has at least one set of a high-fiber density region and a low-fiber density region in the thickness direction thereof.

In the inorganic fiber molded body, the inorganic fibers constituting the inorganic fiber molded body comprise at least one set of regions, specifically, two regions that are different in density from each other, and have such a structure that these regions are contacted with each other. The portions at which the two regions that are different in density of the inorganic fibers from each other are contacted with each other are also regarded as regions having a gradient of the density of the inorganic fibers.

In addition, the inorganic fiber molded body comprises the high-fiber density region on at least one surface side of the inorganic fiber molded body in the thickness direction thereof. However, the inorganic fiber molded body may comprise two high-fiber density regions on both surface sides of the inorganic fiber molded body in the thickness direction thereof and one low-fiber density region disposed between the two high-fiber density regions, namely, may comprise two regions having a gradient of the density of the inorganic fibers. Further, the inorganic fiber molded body may comprise a plurality of the high-fiber density regions and a plurality of the low-fiber density regions and therefore a plurality of the regions having a gradient of the density of the inorganic fibers.

In the present invention, with the above structure in which the inorganic fiber molded body comprises two high-fiber density regions on both surface sides of the inorganic fiber molded body in the thickness direction thereof and one low-fiber density region disposed between the two high-fiber density regions, namely, comprises two regions having a gradient of the density of the inorganic fibers, it is possible to suppress scattering or falling-off of the inorganic fibers and the particulate matters such as the inorganic binder particles and maintain a thermal shock resistance, a mechanical shock resistance and a high-speed wind erosion resistance of the inorganic fiber molded body itself, in a desirable manner.

The fiber density of the above respective regions of the inorganic fiber molded body represents a surface density [$g/m^2$] of the respective regions. The fiber density (surface density) of the respective regions of the inorganic fiber molded body has the same meaning as the surface density of the respective regions of the inorganic fiber molded body, for example, when the inorganic fiber molded body is produced by impregnating an inorganic binder such as an inorganic sol into the aggregate of inorganic fibers and drying the resulting product.

In the inorganic fiber molded body, the fiber density of the high-fiber density region in terms of a surface density of the aggregate of inorganic fibers is usually 1000 to 4000 $g/m^2$, preferably 1500 to 3800 $g/m^2$, and more preferably 2000 to 3600 $g/m^2$. When the fiber density of the high-fiber density region is excessively small, the amount of fibers in the high-fiber density region tends to be reduced so that merely an extremely thin molded body tends to be produced, and there is therefore caused such a tendency that the resulting molded body is deteriorated in usefulness or utility as an insulating inorganic fiber molded body. On the contrary, when the fiber density of the high-fiber density region is excessively large, the amount of fibers in the high-fiber density region tends to be excessively increased, so that the thickness of the aggregate of inorganic fibers tends to be hardly controlled, and therefore production of the desirable inorganic fiber molded body tends to be difficult.

In the inorganic fiber molded body, the surface density of the aggregate of inorganic fibers is usually 1000 to 4000 $g/m^2$, preferably 1500 to 3800 $g/m^2$, and more preferably 2000 to 3600 $g/m^2$. In the inorganic fiber molded body, the fiber density of the high-fiber density region is usually 300 to 4500 $g/m^2$, preferably 330 to 4200 $g/m^2$, and more preferably 360 to 4000 $g/m^2$.

The difference between the inorganic fiber density of the high-fiber density region and the inorganic fiber density of the low-fiber density region may be appropriately determined according to desired properties of the finally obtained inorganic fiber molded body. In the present invention, the portion at which the difference between the fiber density of the high-fiber density region and the fiber density of the low-fiber density region, i.e., the difference between an absolute value of the surface density of the high-fiber density region and an absolute value of the surface density of the low-fiber density region is not less than 0.005 $g/cm^2$, is defined as being a boundary between these two regions.

The fiber density difference between the high-fiber density region and the low-fiber density region is usually not less than 0.005 $g/cm^2$, preferably not less than 0.0075 $g/cm^2$, more preferably not less than 0.009 $g/cm^2$, and still more preferably not less than 0.010 $g/cm^2$.

When controlling the fiber density ratio within the above-specified range, it is possible to suppress scattering or falling-off of the inorganic fibers and the particulate matters such as the inorganic binder particles and maintain a thermal shock resistance, a mechanical shock resistance and a high-speed wind erosion resistance of the inorganic fiber molded body itself, in a desirable manner.

In the inorganic fiber molded body, the fiber density, in particular, that within the high-fiber density region, may vary along the thickness direction thereof. In particular, in the high-fiber density region, the fiber density is preferably increased toward an outermost surface side of the inorganic fiber molded body.

The fiber density within the high-fiber density region may be changed in either a continuous manner or a stepwise manner. Among them, the inorganic fiber molded body whose fiber density within the high-fiber density region is changed in a stepwise manner is preferred because such a molded body can be more readily produced. In the case where the fiber density within the high-fiber density region is changed in a stepwise manner, it is preferred that the difference in fiber density between the respective regions is small, i.e., an absolute value of the difference in fiber density between the respective regions is small. Among them, the difference in fiber density between the respective regions is preferably less than 0.005 $g/cm^2$, more preferably not more than 0.004 $g/cm^2$, and especially preferably not more than 0.003 $g/cm^2$.

In the low-fiber density region, it is preferred that the fiber density on its inner side, i.e., on a side thereof opposite to its side where the low-fiber density region is contacted with the high-fiber density region is changed so as to further decrease in the thickness direction.

The fiber density within the low-fiber density region may be changed in either a continuous manner or a stepwise manner. Among them, the inorganic fiber molded body whose fiber density within the low-fiber density region is changed in a stepwise manner is preferred because such a molded body can be more readily produced. In the case where the fiber density within the low-fiber density region is changed in a stepwise manner, it is preferred that the difference in fiber density between the respective regions is large, i.e., an absolute value of the difference in fiber density between the respective regions is large. Among them, the difference in fiber density between the respective regions is preferably equal to or larger than that of the high-fiber density region. More specifically, for example, the difference in fiber density between the respective regions is preferably more than 0.005 $g/cm^2$, more preferably not less than 0.0075 $g/cm^2$, and still more preferably not less than 0.010 $g/cm^2$.

The inorganic fiber molded body of the present invention comprises binder particles. One of features of the present invention resides in that the ratio of a content of the binder particles in the high-fiber density region to a content of the binder particles in the low-fiber density region is 0.5:1 to 5:1.

When the ratio of the content of the binder particles in the high-fiber density region to the content of the binder particles in the low-fiber density region lies within the above-specified range, it is possible to suppress scattering or falling-off of the inorganic fibers and the particulate matters such as the inorganic binder particles and maintain a thermal shock resistance, a mechanical shock resistance and a high-speed wind erosion resistance of the inorganic fiber molded body itself, in a desirable manner. The ratio of the content of the binder particles in the high-fiber density region to the content of the binder particles in the low-fiber density region is preferably 1.1:1 to 5:1, more preferably 1.2:1 to 4.5:1 and still more preferably 1.5:1 to 3.5:1.

One of the features of the present invention resides in that the number-average particle diameter of the inorganic binder particles in a field of view of 400 µm×400 µm on an outermost surface (high-fiber density region) of the molded body is 20 to 35 µm, and the number of the inorganic binder particles is less than 15.

The field of view of 400 µm×400 µm on an outermost surface of the molded body means an area of 400 µm×400 µm on a micrographic image of a central portion of the outermost surface of the molded body which is obtained by a scanning electron microscope. The number-average particle diameter and the number of the inorganic binder particles in the field of view of 400 µm×400 µm are measured by visually observing an image obtained by magnifying the corresponding field of view by 150 times. The number-average particle diameter of the inorganic binder particles may be determined as follows. That is, a shortest particle diameter of each of the inorganic binder particles is measured on the above image as a particle diameter thereof. Then, the number-average particle diameter of the inorganic binder particles is calculated from the particle diameters of all of the inorganic binder particles measured in the field of view.

In the present invention, the number-average particle diameter of the inorganic binder particles in the above field of view on the outermost surface of the inorganic fiber molded body is 20 to 35 µm. When the number-average particle diameter of the inorganic binder particles lies within the above-specified range, it is possible to suppress scattering or falling-off of the inorganic fibers and the particulate matters such as the inorganic binder particles and maintain a thermal shock resistance, a mechanical shock resistance and a high-speed wind erosion resistance of the inorganic fiber molded body itself, in a desirable manner. The number-average particle diameter of the inorganic binder particles is preferably 21 to 33 µm and more preferably 21 to 32 µm.

In addition, in the present invention, the number of the inorganic binder particles in the above field of view on the outermost surface of the inorganic fiber molded body is less than 15. When the number of the inorganic binder particles lies within the above-specified range, a predetermined amount or more of the inorganic binder particles are allowed to remain in the molded body, so that it is possible to suppress scattering or falling-off of the inorganic fibers and the particulate matters such as the inorganic binder particles and maintain a thermal shock resistance, a mechanical shock resistance and a high-speed wind erosion resistance of the inorganic fiber molded body itself, in a desirable manner. The lower limit of the number of the inorganic binder particles in the above field of view may be appropriately determined, and is usually 1. The number of the inorganic binder particles in the above field of view is preferably not more than 13 and more preferably not more than 10. The upper limit of the number of the inorganic binder particles in the above field of view is preferably 2 and more preferably 3.

[Process for Producing Inorganic Fiber Molded Body and the Like]

The process for producing the inorganic fiber molded body is not particularly limited and therefore optional, and the inorganic fiber molded body may be produced by conventionally known optional processes. In general, the inorganic fiber molded body may be produced by the process including the steps of obtaining an aggregate of an inorganic fiber precursor; subjecting the aggregate of the inorganic fiber precursor to needling treatment or the like; firing the aggregate of the inorganic fiber precursor subjected to the needling treatment to obtain an aggregate of inorganic fibers; and impregnating an inorganic binder such as an inorganic sol into the aggregate of inorganic fibers, followed by drying the resulting product.

In the following, the process for producing the inorganic fiber molded body according to the present invention as well as the inorganic fibers and inorganic binder particles used as the raw materials constituting the inorganic fiber molded body according to the present invention, and the like, are explained by referring to a series of the above steps as specific examples of steps of the production procedure.

[Inorganic Fibers]

The inorganic fibers used in the inorganic fiber molded body are not particularly limited, and in the present invention, any conventional known optional inorganic fibers may be used as the inorganic fibers. Specific examples of the inorganic fibers used in the inorganic fiber molded body include single-component fibers comprising, for example, silica, alumina/silica, zirconia, spinel, titania or the like, and composite fibers formed of these substances. Of these inorganic fibers, from the standpoints of a heat resistance, a fiber strength (toughness) and safety, alumina/silica-based fibers are preferred, and polycrystalline alumina/silica-based fibers are more preferred.

The composition ratio (mass ratio) of alumina/silica of the alumina/silica-based fibers is preferably in the range of 65 to 98/35 to 2 which corresponds to the composition called a mullite composition or a high-alumina composition, more preferably 70 to 95/30 to 5, and still more preferably 70 to 74/30 to 26.

The inorganic fibers preferably comprise the above polycrystalline alumina/silica-based fibers having a mullite composition in an amount of not less than 80% by mass, more preferably not less than 90% by mass and most preferably 100% by mass (as a whole amount).

The crystallinity of the inorganic fibers is optional, and may be appropriately determined according to required properties of the resulting inorganic fiber molded body, and is usually not less than 30% of a peak height of mullite having a crystallinity of 100%. However, if the crystallinity of the inorganic fibers is excessively low, the inorganic fibers tend to suffer from remarkable contraction when used under high-temperature heating conditions. Therefore, the crystallinity of the inorganic fibers is preferably not less than 50% and more preferably not less than 60%. The upper limit of the crystallinity of the inorganic fibers is usually 95%, preferably 90% and more preferably 85% in view of maintaining a mechanical strength of the resulting fiber molded body.

[Fiber Length of Inorganic Fibers]

The fiber length (number-average fiber length) of the inorganic fibers may be appropriately determined. However, when the fiber length of the inorganic fibers is less than 200

μm, the resulting inorganic fiber molded body tends to be deteriorated in toughness against mechanical shock or tends to be deteriorated in function of preventing propagation of cracks against thermal shock. On the contrary, when the fiber length of the inorganic fibers is excessively long, it may be difficult to control a thickness of the aggregate of inorganic fibers upon formation thereof, so that the thickness of the resulting inorganic fiber molded body also tends to be hardly controlled.

Therefore, the number-average fiber length of the inorganic fibers is usually 210 to 1000 μm, preferably 220 to 800 μm, more preferably 220 to 600 μm and still more preferably 230 to 500 μm.

The shape of the inorganic fibers may be appropriately determined, and the inorganic fibers preferably comprise substantially no fibers having a fiber diameter of not more than 3 μm. The expression "substantially no fibers having a fiber diameter of not more than 3 μm" means that the content of the fibers having a fiber diameter of not more than 3 μm in the inorganic fibers is not more than 0.1% by mass based on a total mass % of the whole fibers.

The average fiber diameter of the inorganic fibers in the aggregate of inorganic fibers is preferably 5 to 7 μm. When the average fiber diameter of the inorganic fibers is excessively thick, the resulting aggregate of inorganic fibers tends to lose resilience and toughness. When the average fiber diameter of the inorganic fibers is excessively thin, the amount of fiber dusts floating in air tends to be increased so that there is a high probability that the resulting aggregate of inorganic fibers comprises those fibers having a fiber diameter of not more than 3 μm.

The aggregate of inorganic fibers having the above suitable average fiber diameter which comprises substantially no fibers having a fiber diameter of not more than 3 μm may be produced by the below-mentioned precursor fiberization method in which a viscosity of a spinning solution, an air flow used in a spinning nozzle, a drying condition of a drawn yarn, etc., are well controlled.

[Aggregate of Inorganic Fibers]

The inorganic fiber molded body according to the present invention is obtained by impregnating an inorganic sol as an inorganic binder into an aggregate of inorganic fibers comprising the above-mentioned inorganic fibers.

The aggregate of inorganic fibers preferably comprises substantially no fibers having a fiber diameter of not more than 3 μm and are in the form of a needle blanket obtained by subjecting the aggregate of inorganic fibers to needling treatment.

[Needling Density]

The needling density of the aggregate of inorganic fibers subjected to needling treatment may be appropriately determined, and is usually 2 to 200 punches/cm$^2$, preferably 2 to 150 punches/cm$^2$, more preferably 2 to 100 punches/cm$^2$, and still more preferably 2 to 50 punches/cm$^2$. When the needling density of the aggregate of inorganic fibers is excessively low, the resulting inorganic fiber molded body tends to be deteriorated in uniformity of a thickness thereof, etc. When the needling density of the aggregate of inorganic fibers is excessively high, the inorganic fibers tend to be injured and readily scattered after firing the aggregate of inorganic fibers, and the resulting inorganic fiber molded body tends to be deteriorated in thermal shock resistance.

[Surface Density and Thickness]

The surface density of the aggregate of inorganic fibers may be appropriately determined in view of the high-fiber density region and the low-fiber density region in the resulting inorganic fiber molded body. The surface density of the aggregate of inorganic fibers in the high-fiber density region is usually 1000 to 4000 g/m$^2$, preferably 1500 to 3800 g/m$^2$ and more preferably 2000 to 3600 g/m$^2$.

The surface density of the aggregate of inorganic fibers is usually 1000 to 4000 g/m$^2$, preferably 1500 to 3800 g/m$^2$ and more preferably 2000 to 3600 g/m$^2$.

When the surface density of the aggregate of inorganic fibers in the high-fiber density region is excessively low, the amount of fibers in the high-fiber density region tends to be reduced, so that merely a thin molded body tends be produced and therefore deteriorated in usefulness or utility as an insulating inorganic fiber molded body. On the contrary, when the surface density of the aggregate of inorganic fibers in the high-fiber density region is excessively high, the amount of fibers therein tends to be excessively increased, so that it may be difficult to control a thickness of the aggregate of inorganic fibers by the needling treatment, and therefore the aimed inorganic fiber molded body tends to be hardly produced.

The thickness of the aggregate of inorganic fibers is not particularly limited and may be appropriately designed according to the applications thereof, and is usually about 2 to about 35 mm.

[Method for Producing Aggregate of Inorganic Fibers]

The method for producing an aggregate of inorganic fibers is not particularly limited. The aggregate of inorganic fibers may be usually produced by such a method including a step of forming an aggregate of an inorganic fiber precursor, subjecting the resulting aggregate of the inorganic fiber precursor to needling treatment, and firing the aggregate of the inorganic fiber precursor thus subjected to needling treatment to form the aimed aggregate of inorganic fibers.

The method for producing the aggregate of inorganic fibers will be described below by referring to an example of a process for producing an aggregate of alumina/silica-based fibers. However, the aggregate of inorganic fibers according to the present invention is not limited to the aggregate of alumina/silica-based fibers. As described above, the aggregate of inorganic fibers may be an aggregate of silica, zirconia, spinel, titania or composite fibers thereof.

[Spinning Step]

In order to produce the aggregate of alumina/silica-based fibers by the precursor fiberization method, fibers are spun from a spinning solution comprising basic aluminum chloride, a silicon compound, an organic polymer serving as a thickener, and water by a blowing method to obtain an aggregate of an alumina/silica fiber precursor.

[Preparation of Spinning Solution]

Basic aluminum chloride: $Al(OH)_{3-x}Cl_x$ may be prepared, for example, by dissolving metallic aluminum in hydrochloric acid or an aqueous aluminum chloride solution. In the chemical formula described above, the value of x is usually in the range of 0.45 to 0.54 and preferably 0.5 to 0.53. As the silicon compound, a silica sol is preferably used. Alternatively, tetraethyl silicate or a water-soluble silicon compound, such as a water-soluble siloxane derivative may also be used. As the organic polymer, for example, a water-soluble polymer compound, e.g., polyvinyl alcohol, polyethylene glycol or polyacrylamide, is preferably used. These organic polymers usually have a degree of polymerization of 1000 to 3000.

The ratio of aluminum derived from the basic aluminum chloride to silicon derived from the silicon compound in the spinning solution is usually 99:1 to 65:35 and preferably 99:1 to 70:30 in terms of a mass ratio of $Al_2O_3$ to $SiO_2$. The concentration of aluminum in the spinning solution is preferably in the range of 170 to 210 g/L, and the concentration of the organic polymer in the spinning solution is preferably in the range of 20 to 50 g/L.

In the case where the content of the silicon compound in the spinning solution is less than the above-specified range, alumina constituting short fibers tends to be easily converted into α-alumina, and the increase in size of alumina particles tends to cause brittleness of the short fibers. On the other hand, in the case where the content of the silicon compound in the spinning solution is more than the above-specified range, the content of silica ($SiO_2$) formed together with mullite ($3Al_2O_3 \cdot 2SiO_2$) tends to be increased, so that the heat resistance of the resulting alumina/silica-based fibers tends to be reduced.

In any of the case where the concentration of aluminum in the spinning solution is less than 170 g/L and the case where the concentration of the organic polymer in the spinning solution is less than 20 g/L, the spinning solution tends to fail to have an appropriate viscosity, thus reducing a fiber diameter of the resulting alumina/silica-based fibers. That is, an excessively large amount of free water in the spinning solution results in a low drying rate during the spinning by the blowing method, leading to excessive drawing of fibers. As a result, the fiber diameter of the spun precursor fibers tends to be changed, failing to provide short fibers having a predetermined average fiber diameter and a sharp fiber diameter distribution.

Furthermore, in the case where the aluminum concentration is less than 170 g/L, the productivity tends to be reduced. On the other hand, in any of the case where the aluminum concentration exceeds 210 g/L and the case where the organic polymer concentration exceeds 50 g/L, the viscosity of the resulting solution tends to be too high to use such a solution as a spinning solution. The concentration of aluminum in the spinning solution is preferably in the range of 180 to 200 g/L. The concentration of the organic polymer in the spinning solution is preferably in the range of 30 to 40 g/L.

The spinning solution described above is prepared by adding the silicon compound and the organic polymer to an aqueous basic aluminum chloride solution in such amounts as to satisfy the above ratio of $Al_2O_3$ to $SiO_2$, and then concentrating the resulting mixture such that the aluminum concentration and the organic polymer concentration in the spinning solution fall within the above-specified ranges.

[Spinning]

Spinning (formation of fibers from the spinning solution) is usually performed by a blowing method in which the spinning solution is fed into a high-speed spinning gas flow, thereby producing an alumina/silica-based fiber precursor. The structure of a spinning nozzle used in the above spinning procedure is not particularly limited. For example, preferred is such a structure as described in Japanese Patent No. 2602460 in which an airflow blown from an air nozzle and a flow of a spinning solution emerging from a spinning solution supply nozzle are parallel to each other, and the parallel flow of air is sufficiently rectified and comes into contact with the spinning solution.

Upon the spinning, fibers sufficiently drawn are formed from the spinning solution under the conditions in which the evaporation of water and the decomposition of the spinning solution are prevented, and then the resulting fibers are preferably rapidly dried. To this end, the atmosphere is preferably changed from a state in which the evaporation of water is suppressed to a state in which the evaporation of water is promoted, in the course of from the formation of fibers from the spinning solution to the arrival of the fibers at a fiber collector.

The aggregate of the alumina/silica-based fiber precursor may be recovered in the form of a continuous sheet (thin-layer sheet) within an accumulating device having a structure in which a wire-mesh endless belt is arranged so as to be substantially perpendicular to the spinning airflow and in which the spinning airflow comprising the alumina/silica-based fiber precursor impinges on the belt while the endless belt is rotated. The thin-layer sheets may be overlapped and laminated on each other to obtain an aggregate of the alumina/silica-based fiber precursor.

[Needling Treatment Step]

The aggregate of the alumina/silica-based fiber precursor produced by the spinning is then subjected to needling treatment. In the present invention, the needling treatment is preferably performed under the conditions in which the above needling density is satisfied. The needling treatment is usually conducted using a needle punching machine. The needle punching is a method of repeatedly piecing the aggregate of the alumina/silica-based fiber precursor (fibers) with needles moving up and down at a high speed to entangle the fibers by projections called "barbs" knurled in the needles. The number of the fibers sewed in a thickness direction of the aggregate becomes larger on a surface thereof on which the needles are pierced. Therefore, the fiber density of the needle entering surface of the aggregate is increased as compared to a surface thereof opposite to the needle entering surface.

[Firing Step]

The firing after the needling treatment is usually performed at a temperature of 900° C. or higher and preferably 1000 to 1500° C. The firing temperature lower than 900° C. tends to cause insufficient crystallization, thus providing only brittle alumina/silica-based fibers having a low strength. The firing temperature exceeding 1500° C. tends to promote grain growth of crystals of the fibers, thereby providing only brittle alumina/silica-based fibers having a low strength. Therefore, the firing temperature is preferably 1000 to 1400° C. and more preferably 1100 to 1400° C. The firing time may vary depending upon a thickness of the aggregate of the inorganic fiber precursor, etc., and is usually 0.1 to 10 hr, preferably 0.2 to 8 hr, more preferably 0.3 to 6 hr and still more preferably 0.5 to 4 hr.

Next, an example of the procedure for producing the inorganic fiber molded body by impregnating an inorganic sol into the aggregate of inorganic fibers as produced by the above method and drying the thus impregnated aggregate is explained below.

[Inorganic Sol]

As the inorganic sol to be impregnated into the aggregate of inorganic fibers, there is preferably used at least one material selected from the group consisting of alumina, zirconia, titania and magnesia. In addition, there may also be used a sol having the same composition as that of the inorganic fibers constituting the aggregate of inorganic fibers. The inorganic sol may also comprise inorganic short fibers the kind of which is the same as or different from that of the inorganic fibers constituting the aggregate of inorganic fibers, and preferably comprises inorganic short fibers the kind of which is the same as that of the inorganic fibers constituting the aggregate of inorganic fibers. Further, as the inorganic sol, there may also be suitably used a precursor sol comprising the below-mentioned spinel-based compound.

Meanwhile, it is not desirable to use a silica sol as the inorganic sol. That is, silica tends to be converted into cristobalite that is considered to be harmful or toxic to human body when exposed to a temperature of not lower than 1000° C. For this reason, it is preferred to use an inorganic sol other than the silica sol as the inorganic sol.

When using a precursor sol comprising a spinel-based compound represented by the general formula: $Mg_xAl_yO_4$ (wherein atomic ratio y/x≥2) as the inorganic sol, it is possible to enhance an erosion resistance (scale resistance) to iron oxide. The precursor sol may be readily produced using a sol of each of alumina and magnesia. The formation of an oxide of the precursor sol may be conducted by conventionally known high-temperature firing.

The solid content of the inorganic sol is usually about 5 to about 15% by mass and preferably about 7 to about 12% by mass in order to attain an amount (dry solid content) of the inorganic sol impregnated which may be appropriately determined in view of a bulk density, a thickness, a hardness, a mechanical strength and thermal properties of the aimed inorganic fiber molded body as well as production costs. When the solid content of the inorganic sol is excessively low, it is not possible to attain the desired amount of the inorganic sol impregnated, whereas when the solid content of the inorganic sol is excessively high, the inorganic sol tends to be hardly impregnated into the aggregate of inorganic fibers, so that the workability and various properties of the aggregate of inorganic fibers tend to be deteriorated.

Further, as the inorganic binder, there is preferably used an inorganic binder composition comprising the above inorganic sol and an acid component such as acetic acid as a dispersant, and such an inorganic binder composition is preferably impregnated into the aggregate of inorganic fibers. The content of acetic acid, etc., in the inorganic binder composition may be appropriately determined, and is usually 6 to 14% by mass, and preferably 8 to 11% by mass. The viscosity of the inorganic binder composition is preferably is adjusted to 5 to 150 cp by controlling a solid content of the inorganic sol, etc., therein. The use of the inorganic binder composition whose viscosity is adjusted to the above-specified range is preferred since the composition can be efficiently impregnated into the aggregate of inorganic fibers, and the inorganic binder is well dispersed in the resulting inorganic fiber molded body.

The inorganic fiber molded body according to the present invention can be produced by impregnating the above inorganic sol into the aggregate of inorganic fibers and then drying the thus impregnated aggregate. The inorganic sol subjected to the impregnating and drying steps is formed into the inorganic binder particles in the resulting inorganic fiber molded body.

[Impregnation]

In order to impregnate the inorganic sol into the aggregate of inorganic fibers, there may be used the method in which the aggregate of inorganic fibers is placed in a mold, etc., and immersed in the inorganic sol, followed by lifting the aggregate from the inorganic sol, or the like. The impregnation step may be repeated plural times. After completion of the impregnation step, the thus impregnated aggregate is subjected to suction forming such as vacuum evacuation molding or press- or compression-molding to remove a surplus of the sol therefrom, and then transferred to the drying step.

The amount of the inorganic sol impregnated may be appropriately determined according to a bulk density, a thickness, a hardness, a mechanical strength and thermal properties of the aimed inorganic fiber molded body as well as production costs. The amount of the inorganic sol impregnated is usually 10 to 50 parts by mass and preferably 10 to 20 parts by mass (in terms of a dry solid content thereof) based on 100 parts by mass of the inorganic fibers in the aggregate of inorganic fibers.

When the amount of the inorganic sol impregnated is excessively small, the resulting inorganic fiber molded body tends to fail to have a thickness, a hardness, a mechanical strength and a thermal strength, etc., as desired. When the amount of the inorganic sol impregnated is excessively large, the resulting inorganic fiber molded body tends to fail to have a light weight, and tends to suffer from increased amount of dusts generated owing to falling-off of the inorganic binder, etc.

[Drying]

The aggregate of inorganic fibers impregnated with the inorganic sol is dried by heating the aggregate at a temperature of usually 80 to 150° C. When the drying temperature is excessively low, the aggregate of inorganic fibers tends to be hardly dried to a sufficient extent. When the drying temperature is excessively high, the aggregate of inorganic fibers tends to suffer from rapid evaporation of water in the vicinity of a surface layer portion thereof, so that the solid components tend to be migrated and concentrated into the surface layer portion, resulting in occurrence of uneven impregnation in the thickness direction thereof as a whole.

In particular, in the process for producing the inorganic fiber molded body according to the present invention, in the step of drying the aggregate of inorganic fibers impregnated with the inorganic sol as the inorganic binder, the aggregate of inorganic fibers is dried by subjecting the aggregate to suction dehydration from a surface thereof having a maximum area (bottom surface), so that the inorganic fiber molded body can be efficiently produced in a desired manner.

By adopting the above method, it is possible to suppress migration of the inorganic binder particles on the surface of the resulting inorganic fiber molded body in the thickness direction thereof and attain moderate distribution of the inorganic binder particles over the molded body. As a result, it is possible not only to suppress falling-off of the inorganic binder from the inorganic fiber molded body, but also to obtain the inorganic fiber molded body that is excellent in thermal shock resistance and mechanical shock resistance as well as high-speed wind erosion resistance, i.e., well-balanced in various properties.

The method or force for suction dehydration may be appropriately determined. More specifically, for example, in the method using a swirl blower, etc., the suction force thereof is usually adjusted to 1 to 600 $[m^3/min \cdot m^2]$ and preferably 2 to 500 $[m^3/min \cdot m^2]$ per 1 $m^2$ of a bottom surface area of the aggregate of inorganic fibers to be sucked.

Further, in the production process of the present invention, simultaneously with the above suction dehydration, the surface of the mat-like inorganic fiber molded body opposed to the bottom surface thereof (i.e., an upper surface thereof) may be subjected to suction drying while contacting with hot air. This suction drying is desirable because it is possible to remarkably enhance the effect of the above suction dehydration. The hot air used in the suction drying may be usually dried air, etc., but may also be an inert gas such as a nitrogen gas. The temperature of the hot air may be appropriately determined, and is usually 40 to 200° C. and preferably 60 to 200° C.

<Bulk Density and Thickness>

The bulk density of the inorganic fiber molded body is usually about 0.08 to about 0.30 $g/cm^3$, preferably about 0.1 to about 0.26 $g/cm^3$, and more preferably about 0.1 to about 0.2 g/cm³. When the bulk density of the inorganic fiber molded body is excessively low, the resulting molded body tends to be insufficient in mechanical strength. On the contrary, when the bulk density of the inorganic fiber molded body is excessively high, the resulting molded body tends to be deteriorated in toughness and become rigid and brittle. The thickness of the inorganic fiber molded body may also be appropriately determined according to the applications thereof, and is usually about 12.5 to about 50 mm.

[Layer Structure]

The inorganic fiber molded body may be produced by impregnating the inorganic sol into a single layer of the aggregate of inorganic fibers subjected to the above needling treatment without laminating a plurality of layers of the aggregate of inorganic fibers, and then drying the impregnated product, or by impregnating the inorganic sol into a laminate comprising two or more layers of the aggregate of inorganic fibers, and then drying the impregnated product.

On the other hand, in the case where two or more layers of the aggregate of inorganic fibers are overlapped and laminated such that the needle entering surfaces (surfaces forming a high-density region) thereof face to each other, the resulting laminate tends to suffer from the problem of delamination and also tends to fail to exhibit excellent thermal shock resistance and mechanical shock resistance. In addition, since it is difficult to impregnate a small amount of the inorganic sol into such a laminate, the resulting inorganic fiber molded body tends to have a large bulk density and therefore tends to be deteriorated in weight-reducing effect.

[Heat-Insulating Material]

The heat-insulating material according to the present invention is formed of the above inorganic fiber molded body according to the present invention. That is, the inorganic fiber molded body according to the present invention which is formed of the inorganic material is excellent not only in refractory heat-insulating property but also in thermal shock resistance and mechanical shock resistance, and therefore can be suitably used as a refractory heat-insulating material for high-temperature industrial furnaces such as a burner tile by forming the molded body into various optional shapes.

More specifically, the heat-insulating material according to the present invention can be suitably used, for example, in the applications including cylindrical sleeve-shaped heat-insulating materials, furnace walls for electric furnaces or iron-making furnaces which are used under high-temperature conditions, various pipes as peripheral parts of furnaces, refractory heat-insulating materials for use in support members such as skid posts. The heat-insulating material according to the present invention may be of a mat-like shape, and further may be used as an L-shaped heat-insulating material produced by bonding two sheets of the mat-like heat-insulating material to each other and further as a tubular heat-insulating material having a cylindrical shape or a polygonal prism shape which may be fitted to elongated products such as pipes.

EXAMPLES

The present invention is described in more detail below by referring to the following Examples and Comparative Examples. However, these Examples are only illustrative and not intended to limit the present invention thereto, and any changes or modifications thereof are also possible unless they depart from the scope of the present invention.

Meanwhile, the methods for measuring and evaluating various properties or characteristics of the inorganic fiber molded bodies and the aggregates of inorganic fibers obtained in the course of production of the inorganic fiber molded bodies are as follows.

<Fiber Length>

The section of the inorganic fiber molded body observed on a scanning electron micrograph thereof was equally divided into five parts in the form of layers in a thickness direction thereof, and fiber lengths of whole fibers present in a field of view having an area of 400 μm×400 μm which was selected from a central portion of the respective layers on the micrograph were measured to calculate an average fiber length in each layer and determine an average value of the average fiber lengths of the five layers.

<Bulk Density>

The weight of the inorganic fiber molded body was measured by a balance, whereas a length, a width and a thickness of the molded body were measured by calipers to calculate a volume thereof. The bulk density of the inorganic fiber molded body was calculated by dividing the weight by the volume.

<Measurement of Content of Inorganic Binder>

The inorganic fiber molded body (300 mm×300 mm) was cut into a piece of 50 mm×100 mm, and the piece was equally divided into five parts in a thickness direction thereof to prepare first to fifth layer specimens, and the respective specimens were fired at 1000° C. for 3 hr to measure weights of the specimens before and after the firing (weight loss owing to the firing) and calculate contents of the inorganic binder particles in the respective specimens. All of the thus measured values of the contents of the inorganic binder particles were compared with each other to determine a maximum value and a minimum value thereof. Meanwhile, the weight loss owing to the firing was caused due to dissipation of an acid component such as acetic acid included as a dispersant for the inorganic sol as the inorganic binder precursor in the molded body by the firing. The dispersant for the inorganic sol was included in a predetermined amount or ratio based on the inorganic binder in the inorganic sol.

<Measurement of Fiber Density Distribution in Thickness Direction>

The aggregate of inorganic fibers was processed into a piece having an area of 50 mm×100 mm, and the piece was compressed into the aimed thickness of the inorganic fiber molded body and then equally divided into five parts in a thickness direction thereof to measure a weight of the respective layers and calculate a density thereof.

<Wind Erosion Resistance Test>

The inorganic fiber molded body was processed into a piece having an area of 50 mm×100 mm, and a wind of 0.4 MPa to 0.6 MPa blown from a tip end of a 2 mmφ nozzle located spaced at a distance of 20 mm apart from the piece was directed to the piece and contacted with the piece for 10 min to observe whether or not any holes were formed on a surface of the piece and measure a depth of the respective holes if any.

<Particle Diameter and Number of Inorganic Binder Particles>

The minor axis diameters and number of the inorganic particles present in an area of 400 μm×400 μm on an outermost surface of the inorganic fiber molded body were measured on a scanning electron micrograph thereof.

<Spalling Resistance>

The inorganic fiber molded body pre-fired at 1000° C. was heated in a heating furnace at 1500° C., taken out from the furnace and quenched on an aluminum plate to visually observe the change in appearance thereof.

<Scale Resistance>

An iron pellet having a thickness of 1 mm and a size of 5 mm square was rested on a surface of the inorganic fiber molded body, and the inorganic fiber molded body with the iron pellet was heated in a heating furnace at 1500° C. for 3 hr, and taken out from the furnace to visually observe the change in appearance thereof. The degree of erosion by iron oxide was examined based on "spread" and "depth", and evaluated according to five ratings in which Rank 5 represents the condition that no erosion occurred and Rank 1 represents the condition that complete penetration occurred in the thickness direction.

Examples 1 and 2

An aqueous basic aluminum chloride solution having an aluminum concentration of 170 g/L and a ratio Al/Cl (atomic ratio) of 1.8 was prepared. The aluminum concentration was quantitatively determined by a chelate titration method using EDTA. After a silica sol and polyvinyl alcohol were added to the aqueous solution, the resulting mixture was concentrated to prepare a spinning solution having a ratio of aluminum to silicon (weight ratio of $Al_2O_3$ to $SiO_2$) of 72:28, a total mass content of alumina and silica of about 30% by mass in terms of a total mass of oxides thereof, a viscosity of 40 poise (as measured at 25° C. using a rotary viscometer). Fibers were spun from the spinning solution by a blowing method. The resulting fibers were collected to form a mat-like fiber aggregate of an alumina/silica-based fiber precursor. The mat-like fiber aggregate was subjected to needling treatment and then fired at 1200° C. to obtain an aggregate of polycrystalline alumina/silica-based fibers having a size of 600 mm×600 mm and a predetermined thickness (hereinafter also referred to as a "raw fabric"). Meanwhile, the needling treatment was performed at a needling density of not less than 3 punches/cm² using a needle punching machine.

Meanwhile, the composition of the polycrystalline alumina/silica-based fibers was a mullite composition having a ratio of alumina to silica of 72/28 (mass ratio). As a result of measuring diameters of the fibers by observing the resulting fiber aggregate by a microscope, the polycrystalline alumina/silica-based fibers had an average fiber diameter of 5.5 μm (as an average value of 100 fibers) and a minimum fiber diameter of 3.5 μm.

The raw fabric was cut into fabric sheets each approximately having a size of 300 mm×300 mm. The two fabric sheets were used to measure a surface density of the fiber aggregate and form a board-shaped molded body according to the following procedure.

<Measurement of Surface Density of Fiber Aggregate>

(1) The two fabric sheets were overlapped such that the surfaces of these sheets being opposite to needle entering surfaces of the respective sheets (surfaces forming a low-density region relative to the needle entering surfaces) faced to each other. The fiber aggregate formed of the thus overlapped fabric sheets had a thickness, a surface density and a bulk density as shown in Table 1.

(2) Four spacers each having an aimed thickness of the molded body were respectively disposed on four sides of the raw fabric as the fiber aggregate, and the fiber aggregate was compressed until reaching the thickness of the spacers and kept in a compressed state by a clamp. Then, the surface density of the fiber aggregate was measured according to the following procedures (a) to (c): (a): marks for distinguishing five layers formed by equally dividing the fiber aggregate in a thickness direction thereof were put on the respective layers; (b) the fiber aggregate was released from the compressed state and cut into pieces each having a small area of 50 mm×100 mm; (c) the piece was equally divided into five layers at the marks to measure a surface density of the respective layers (first to fifth layers) and further calculate a difference in density between the layers and a fiber density ratio (low-fiber density region/high-fiber density region). The results are shown in Table 2. Meanwhile, in Examples 1 and 2, the second, third and fourth layers formed the low-fiber density region, whereas the first and fifth layers formed the high-fiber density region.

<Production of Board-Shaped Molded Body>

The above procedures (1) and (2) were conducted (the procedures (a) to (c) for measuring the surface density of the fiber aggregate were however omitted).

(3) Then, the fiber aggregate from which the clamp was dismounted to hold the fiber aggregate in a free state was impregnated with an inorganic sol ("Alumina Sol-200" produced by Nissan Chemical Industries, Ltd.) having a solid content as shown in Table 1. Thereafter, the fiber aggregate was held again using the spacers and clamp to reproduce the same compressed state as described above. As a result, the substantially same condition of the surface density of the fiber aggregate as that of the fiber aggregate shown in Table 2 was reproduced. The amount of the alumina sol impregnated into the fiber aggregate in terms of a dry solid content thereof is shown in Table 1.

(4) Next, using a swirl blower, a suction force of 3.0 m³/min was applied to a bottom surface of the raw fabric, and a dried air having a temperature of 125° C. was contacted with an upper surface of the raw fabric (surface thereof opposed to the bottom surface) for 30 min, thereby obtaining board-shaped molded bodies as shown in Table 3. The results of evaluation of the resulting board-shaped molded bodies are shown in Table 3.

Examples 3 to 6

The same procedure as in Example 1 was conducted except that the raw fabric was used in the form of a single-layer sheet having a thickness, a surface density and a bulk density as shown in Table 1 without laminating a plurality of sheets of the raw fabric, thereby obtaining board-shaped molded bodies as shown in Table 3. The surface density, difference in density between the respective layers and fiber density ratio (low-fiber density region/high-fiber density region) measured with respect to the first to fifth layers obtained by equally dividing the compressed height into five parts, are shown in Table 2. In Examples 3 and 4, the first, second and third layers formed the low-fiber density region, whereas the fourth and fifth layers formed the high-fiber density region. In Examples 5 and 6, the first layer formed the low-fiber density region, whereas the second to fifth layers formed the high-fiber density region. The results of evaluation of the resulting board-shaped molded bodies are shown in Table 3.

Comparative Example 1

As the inorganic fibers, there were used those fibers prepared by fibrillating alumina/silica-based fibers having a composition ratio of alumina to silica of 50/50 (mass ratio) obtained by a melt-spinning method into a fiber length of about 200 μm using a dry fibrillation machine. Two hundred grams of the thus fibrillated alumina/silica-based fibers, 30 g of an alumina powder, 50 g of a mullite powder, 20 g of starches, 10 g of a silica sol and 20 g of a coagulant were mixed in 10 L of water using a pulper, and the resulting mixture was subjected to dehydration molding, thereby obtaining a board-shaped molded body as shown in Table 3. The results of evaluation of the thus obtained board-shaped molded body are shown in Table 3.

Comparative Example 2

The same procedure as in Comparative Example 1 was conducted except that as the inorganic fibers, there were used the alumina/silica-based fibers having a composition ratio of alumina to silica of 72/28 (mass ratio), i.e., a mullite composition which were produced in the same manner as in Example 1, thereby obtaining a board-shaped molded body as shown in Table 3. The results of evaluation of the thus obtained board-shaped molded body are shown in Table 3.

Comparative Example 3

The mat-like fiber aggregate formed of the alumina/silica-based fiber precursor having a composition ratio of alumina to silica of 72/28 (mass ratio), i.e., a mullite composition which was produced in the same manner as in Example 1 as the inorganic fibers, was subjected to needle punching in the same manner as in Example 1, thereby obtaining a fiber aggregate as shown in Table 1. The resulting aggregate of inorganic fibers was evaluated by itself as an inorganic fiber molded body without impregnating the aggregate with any inorganic sol. The surface density, difference in density between the respective layers and fiber density ratio (low-fiber density region/high-fiber density region) measured with respect to the first to fifth layers obtained by equally dividing the compressed height into five parts, are shown in Table 2. As a result, the first layer formed the low-fiber density region, whereas the other second to fifth layers formed the high-fiber density region. The results of evaluation of the resulting board-shaped inorganic fiber molded body are shown in Table 3.

Comparative Example 4

The same procedure as in Example 1 was conducted except that the two raw fabric sheets were overlapped such that the surfaces of these sheets serving as a needle entering surface of each sheet (surface forming a high-density region) faced to each other, thereby obtaining a board-shaped inorganic fiber molded body as shown in Table 3. The surface density, difference in density between the respective layers and fiber density ratio (low-fiber density region/high-fiber density region) measured with respect to the first to fifth layers obtained by equally dividing the compressed height into five parts, are shown in Table 2. As a result, it was confirmed that the high-fiber density region of the thus formed molded body was not sufficiently distinguished from the low-fiber density region thereof.

Comparative Example 5

The same procedure as in Example 1 was conducted except that the raw fabric was neither dried by suction from the bottom surface nor by contact with the dried air, and instead allowed to stand for drying in an electric furnace (110 to 120° C.), thereby obtaining a board-shaped inorganic fiber molded body as shown in Table 3. The surface density, difference in density between the respective layers and fiber density ratio (low-fiber density region/high-fiber density region) measured with respect to the first to fifth layers obtained by equally dividing the compressed height into five parts are shown in Table 2. As a result, the second, third and fourth layers formed the low-fiber density region, whereas the first and fifth layers formed the high-fiber density region. The results of evaluation of the resulting board-shaped inorganic fiber molded body are shown in Table 3.

TABLE 1

| Examples and Comparative Examples | Fiber aggregate | | | |
|---|---|---|---|---|
| | Inorganic fibers | | Thickness (mm) | Surface density (g/m$^2$) |
| | Composition | Treatment | | |
| Example 1 | Mullite | Needle blanket | 75 | 2400 |
| Example 2 | | | 87 | 3000 |
| Example 3 | | | 46 | 1500 |
| Example 4 | | | 46 | 1500 |
| Example 5 | | | 25 | 2400 |
| Example 6 | | | 25 | 2400 |
| Comparative Example 1 | Alumina/silica | Fibrillated short fibers | — | — |
| Comparative Example 2 | Mullite | | — | — |
| Comparative Example 3 | | Needle blanket | 25 | 3200 |
| Comparative Example 4 | | | 86 | 3000 |
| Comparative Example 5 | | | 88 | 3000 |

| Examples and Comparative Examples | Fiber aggregate | | Inorganic sol | | |
|---|---|---|---|---|---|
| | Bulk density (g/cm$^3$) | Crystallinity (%) | Kind | Conc. (wt %) | Amount impregnated (weight part) |
| Example 1 | 0.032 | 61 | Alumina sol | 8.2 | 44.0 |
| Example 2 | 0.034 | 58 | | 8.2 | 32.2 |
| Example 3 | 0.033 | 63 | | 10.2 | 42.1 |
| Example 4 | 0.033 | 64 | | 5.5 | 11.3 |
| Example 5 | 0.096 | 83 | | 10.2 | 29.1 |
| Example 6 | 0.096 | 81 | | 5.5 | 9.4 |
| Comparative Example 1 | — | — | — | — | — |
| Comparative Example 2 | — | — | — | — | — |
| Comparative Example 3 | 0.128 | 82 | — | — | — |
| Comparative Example 4 | 0.035 | 59 | Alumina sol | 5.5 | 10.4 |
| Comparative Example 5 | 0.034 | 63 | | 5.5 | 69.0 |

TABLE 2

| Examples and Comparative Examples | Fiber aggregate Surface density (g/cm$^2$) | | | | | |
|---|---|---|---|---|---|---|
| | First layer | *1 | Second layer | *2 | Third layer | *3 |
| Example 1 | 0.055 | 0.009 | 0.045 | 0.006 | 0.039 | 0.005 |
| Example 2 | 0.069 | 0.013 | 0.056 | 0.008 | 0.048 | 0.006 |
| Example 3 | 0.028 | 0.003 | 0.025 | 0.005 | 0.030 | 0.007 |
| Example 4 | 0.025 | 0.000 | 0.025 | 0.007 | 0.032 | 0.007 |
| Example 5 | 0.040 | 0.006 | 0.046 | 0.003 | 0.049 | 0.003 |
| Example 6 | 0.037 | 0.006 | 0.043 | 0.003 | 0.047 | 0.001 |
| Comparative Example 1 | — | — | — | — | — | — |
| Comparative Example 2 | — | — | — | — | — | — |
| Comparative Example 3 | 0.030 | 0.005 | 0.035 | 0.002 | 0.037 | 0.002 |

TABLE 2-continued

| | Fiber aggregate | | | | | |
|---|---|---|---|---|---|---|
| Comparative Example 4 | 0.064 | 0.004 | 0.059 | 0.000 | 0.059 | 0.003 |
| Comparative Example 5 | 0.066 | 0.014 | 0.052 | 0.008 | 0.045 | 0.006 |

| Examples and Comparative Examples | Surface density (g/cm²) | | | Fiber density ratio (low-fiber density region/high-fiber density region) |
|---|---|---|---|---|
| | Fourth layer | *4 | Fifth layer | |
| Example 1 | 0.044 | 0.011 | 0.055 | 0.711 |
| Example 2 | 0.054 | 0.015 | 0.069 | 0.697 |
| Example 3 | 0.037 | 0.001 | 0.036 | 0.675 |
| Example 4 | 0.040 | 0.001 | 0.038 | 0.630 |
| Example 5 | 0.047 | 0.003 | 0.049 | 0.812 |
| Example 6 | 0.046 | 0.002 | 0.047 | 0.782 |
| Comparative Example 1 | — | — | — | — |
| Comparative Example 2 | — | — | — | — |
| Comparative Example 3 | 0.035 | 0.002 | 0.037 | 0.812 |
| Comparative Example 4 | 0.062 | 0.001 | 0.063 | 0.928 |
| Comparative Example 5 | 0.050 | 0.014 | 0.064 | 0.674 |

Note
*1: Difference in density between first and second layers;
*2: Difference in density between second and third layers;
*3: Difference in density between third and fourth layers Note
*4: Difference in density between fourth and fifth layers

TABLE 3

| | Board-shape molded body | | | | |
|---|---|---|---|---|---|
| Examples and Comparative Examples | Average fiber diameter (μm) | Minimum fiber diameter (μm) | Average fiber length (μm) | Thickness (mm) | Bulk density (g/cm³) |
| Example 1 | 5.5 | 3.5 | 264 | 22.7 | 0.15 |
| Example 2 | 5.5 | 3.5 | 235 | 25.4 | 0.16 |
| Example 3 | 5.5 | 3.5 | 280 | 11.7 | 0.18 |
| Example 4 | 5.5 | 3.5 | 272 | 12.4 | 0.13 |
| Example 5 | 5.5 | 3.5 | 270 | 13.2 | 0.23 |
| Example 6 | 5.5 | 3.5 | 254 | 15.1 | 0.17 |
| Comparative Example 1 | 4.8 | 0.24 | 78 | 25.7 | 0.42 |
| Comparative Example 2 | 5.5 | 3.5 | 161 | 25.1 | 0.32 |
| Comparative Example 3 | 5.5 | 3.5 | 255 | 25.2 | 0.13 |
| Comparative Example 4 | 5.5 | 3.5 | 287 | 25.7 | 0.13 |
| Comparative Example 5 | 5.5 | 3.5 | 279 | 27.7 | 0.18 |

| | Board-shape molded body | | | | | | |
|---|---|---|---|---|---|---|---|
| Examples and Comparative Examples | Binder content (g) | | | | | Binder content ratio | |
| | 1st layer | 2nd layer | 3rd layer | 4th layer | 5th layer | Max. | Min. |
| Example 1 | 0.57 | 0.47 | 0.30 | 0.36 | 0.60 | 2.00 | 1.21 |
| Example 2 | 0.51 | 0.25 | 0.22 | 0.23 | 0.69 | 3.14 | 2.04 |
| Example 3 | 0.25 | 0.24 | 0.24 | 0.28 | 0.63 | 2.63 | 1.12 |
| Example 4 | 0.16 | 0.15 | 0.12 | 0.28 | 0.34 | 2.83 | 1.75 |
| Example 5 | 0.56 | 0.32 | 0.53 | 0.77 | 0.85 | 1.52 | 0.57 |
| Example 6 | 0.26 | 0.19 | 0.68 | 0.49 | 0.42 | 2.62 | 0.73 |
| Comparative Example 1 | 0.31 | 0.33 | 0.31 | 0.31 | 0.35 | 1.13 | 1.00 |
| Comparative Example 2 | — | — | — | — | — | — | — |
| Comparative Example 3 | — | — | — | — | — | — | — |
| Comparative Example 4 | 0.23 | 0.23 | 0.38 | 0.47 | 0.57 | 2.48 | 1.00 |
| Comparative Example 5 | 0.90 | 0.09 | 0.07 | 0.08 | 1.08 | 15.40 | 10.00 |

| | Board-shape molded body | | | | |
|---|---|---|---|---|---|
| | Depth of erosion upon contact with high-speed wind (mm) | | Spalling resistance (results of observation of appearance) | Surface particulate matters | |
| Examples and Comparative Examples | 0.4 MPa | 0.6 MPa | | Number-average particle diameter (μm) | Number of particulate matters (number per 400 μm □) |
| Example 1 | 1 | 1 | Extremely small number of cracks between layers | 31.8 | 4 |
| Example 2 | 1 | 2 | | 21.3 | 3 |
| Example 3 | 2 | 2 | | 27.7 | 7 |
| Example 4 | 2 | 3 | | 26.4 | 5 |
| Example 5 | 2 | 2 | | 24.8 | 9 |
| Example 6 | 3 | 3 | | 24.3 | 7 |
| Comparative Example 1 | <1 | <1 | Large cracks on surface | Non-fiber portions formed a continuous layer | |
| Comparative Example 2 | <1 | <1 | Large cracks between layers | | |
| Comparative Example 3 | 11 | 14 | No cracks between layers | 11.1 | 2 |
| Comparative Example 4 | 3 | 5 | Delamination | 17.2 | 7 |
| Comparative Example 5 | <1 | <1 | | 61.4 | 5 |

From Tables 1 to 3, it was confirmed that according to the present invention, there can be provided a light-weight heat-insulating material that causes less scattering of fibers and particulate matters since the material is prevented from undergoing rapid breakage, i.e., is excellent thermal shock resistance and mechanical shock resistance as well as high-speed wind erosion resistance, and has excellent well-balanced properties, and therefore can be suitably used in the applications of various kinds of heat-insulating materials.

The invention claimed is:

1. An inorganic fiber molded body, comprising:
an aggregate of inorganic fibers subjected to a needling treatment; and
a plurality of inorganic binder particles consisting essentially of at least one material selected from the group consisting of alumina, zirconia, titania, and magnesia,
wherein the inorganic fiber molded body has at least one set of a high-fiber density region and a low-fiber density region, in which a ratio of a content of the binder particles in the high-fiber density region to a content of the binder particles in the low-fiber density region is 0.5:1 to 5:1, wherein the content of the binder particles in the high-fiber density region and the content of the binder particles in the low-fiber density region are measured by equally dividing the inorganic fiber molded body into five parts in a thickness direction thereof to prepare first to fifth layer specimens, firing each of the specimens at 1000° C. for 3 hours, measuring weights of each of the specimens before and after the firing to determine a weight loss owing to the firing, and calculating a content of the inorganic binder particles in each of the specimens, a number-average particle diameter of the inorganic binder particles on an outermost surface of the molded body is 20 to 35 μm, wherein the number-average particle diameter is determined by measuring a minor axis diameter of the inorganic particles present in an area of 400 μm×400 μm on the outermost surface of the molded body as viewed on a scanning electron micrograph, and a number of the inorganic binder particles present in the area of 400 μm×400 μm on the outermost surface of the molded body is less than 15, as viewed on a scanning electron micrograph.

2. The inorganic fiber molded body according to claim 1, wherein a difference between an absolute value of a surface density of the high-fiber density region and an absolute value of a surface density of the low-fiber density region is not less than 0.005 g/cm$^2$.

3. The inorganic fiber molded body according to claim 1, wherein the inorganic fiber molded body has the high-fiber density regions at both ends of the thickness direction thereof, and the low-fiber density region is provided between the high-fiber density regions.

4. The inorganic fiber molded body according to claim 1, wherein the inorganic fibers have a crystallinity of not less than 50%.

5. The inorganic fiber molded body according to claim 1, wherein the inorganic fibers comprise at least one selected from the group consisting of silica, alumina, zirconia, spinel, and titania.

6. The inorganic fiber molded body according to claim 1, wherein the inorganic fibers comprise alumina and silica.

7. The inorganic fiber molded body according to claim 1, wherein the inorganic fibers have a number-average fiber length of from 210 μm to 1000 μm, have an average fiber diameter of from 5 μm to 7 μm, and is substantially free of a fiber having a fiber diameter of not more than 3 μm.

8. The inorganic fiber molded body according to claim 1, wherein the aggregate of inorganic fibers are subjected to the needling treatment of 2 to 200 punches/cm$^2$.

9. The inorganic fiber molded body according to claim 1, wherein the aggregate of inorganic fibers has a thickness of from 2 mm to 35 mm.

10. The inorganic fiber molded body according to claim 1, wherein the ratio of the content of the binder particles in the high-fiber density region to the content of the binder particles in the low-fiber density region is 1.1:1 to 5:1.

11. The inorganic fiber molded body according to claim 1, wherein the aggregate of inorganic fibers is produced by a process comprising forming an aggregate of an inorganic fiber precursor, subjecting the aggregate of an inorganic fiber precursor to a needling treatment, and then firing the aggregate of an inorganic fiber precursor at a temperature of 900° C. to 1500° C.

12. The inorganic fiber molded body according to claim 1, wherein the inorganic fiber molded body is produced by a process consisting essentially of impregnating an inorganic binder into the aggregate of inorganic fibers, and drying the aggregate of inorganic fibers impregnated with the inorganic binder at a temperature of from 80° C. to 150° C.

13. The process according to claim 12, wherein the inorganic binder is in the form of an inorganic sol.

14. A process for producing the inorganic fiber molded body of claim 1, comprising:

impregnating an inorganic binder into the aggregate of inorganic fibers; and drying the aggregate of inorganic fibers impregnated with the inorganic binder by suction dehydration from a bottom surface of the aggregate of inorganic fibers.

15. The process according to claim 14, further comprising:

contacting an upper surface of the inorganic fiber molded body with a dry gas flow having a temperature of 60 to 200° C., wherein the drying and the contacting are carried out at the same time.

16. The process according to claim 14, wherein the inorganic binder comprises acetic acid and has a viscosity of 5 to 150 cp.

17. The process according to claim 14, further comprising:

producing the aggregate of inorganic fibers by a process comprising subjecting an aggregate of an inorganic fiber precursor to a needling treatment, and firing the aggregate of an inorganic fiber precursor subjected to the needling treatment at a temperature of 1100° C. to 1400° C. for 0.5 to 4 hours.

* * * * *